(12) United States Patent
Wu et al.

(10) Patent No.: US 11,272,035 B1
(45) Date of Patent: Mar. 8, 2022

(54) API SERVICE GATEWAY FOR THIRD-PARTY SERVICES

(71) Applicant: PayPal, Inc., San Jose, CA (US)

(72) Inventors: Zhibiao Wu, San Jose, CA (US); Calvin Ting Li Ling, Milpitas, CA (US); Xiaoyan Qu, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/162,741

(22) Filed: Jan. 29, 2021

(51) Int. Cl.
```
G06F 15/167    (2006.01)
G06F 15/16     (2006.01)
H04L 67/61     (2022.01)
H04L 67/5682   (2022.01)
H04L 43/0852   (2022.01)
H04L 67/53     (2022.01)
H04L 67/133    (2022.01)
G06F 15/173    (2006.01)
```
(52) U.S. Cl.
CPC ........ H04L 67/322 (2013.01); H04L 43/0852 (2013.01); H04L 67/20 (2013.01); H04L 67/2852 (2013.01); H04L 67/40 (2013.01)

(58) Field of Classification Search
CPC ... H04L 67/322; H04L 67/20; H04L 43/0852; H04L 67/40; H04L 67/2852
USPC .................................................. 709/224, 217
See application file for complete search history.

(56) References Cited

U.S. PATENT DOCUMENTS

| | | |
|---|---|---|
| 2009/0083578 A1 | 3/2009 | Nan et al. |
| 2016/0011863 A1 | 1/2016 | Isaacson et al. |
| 2016/0259789 A1 | 9/2016 | Shrinath et al. |
| 2017/0212735 A1 | 7/2017 | Levi et al. |
| 2021/0042210 A1 | 2/2021 | Chang et al. |

*Primary Examiner* — Karen C Tang
(74) *Attorney, Agent, or Firm* — Kowert, Hood, Munyon, Rankin & Goetzel, P.C.

(57) ABSTRACT

Techniques are disclosed relating to providing a service gateway between one or more applications hosted within a server system and one or more third-party services hosted by third-party systems. For example, a server system may provide a service gateway for a plurality of applications. The service gateway may provide the plurality of applications with access to third-party services hosted by third-party systems. Further, the service gateway may maintain, for a first one of these third-party services, a local copy of data, from a first dataset stored at the third-party system, in a local cache. In various embodiments, the service gateway may receive, from an application hosted by the server system, a request to perform a data-access operation via the first third-party service and, in response to detecting that the first third-party service has a limited level of service-availability, the service gateway may service the data-access operation using the local cache.

20 Claims, 6 Drawing Sheets

400

---

Provide a service gateway for a plurality of applications hosted by one or more application servers in a server system, where the service gateway is operable to provide the plurality of applications with access to a plurality of third-party services hosted by third-party systems
402

↓

Maintain, for a first one of the plurality of third-party services, a local copy of data, from a first dataset, in a local cache system, where the first dataset is stored by a first third-party system that provides the first third-party service using the first dataset, and where, in the local copy, the data from the first dataset is specified using a plurality of data objects
404

↓

Receive, from a first one of the plurality of applications, a request to perform a data-access operation via a first one of a plurality of third-party services
406

↓

In response to detecting that the first third-party service has a limited level of service-availability, perform the data-access operation using the local copy of the data from the first dataset, where performing the data-access operation includes modifying the first data object stored in the local cache system
408

↓

Sync the modification to the first data object to the first third-party service based on a determination that the first third-party service has an increased level of service-availability
410

Maintain, for a first one of a plurality of third-party services hosted by third-party systems, a local copy of data, from a first dataset, in a local cache system, where the first dataset is stored by a first third-party system that provides the first third-party service, and where, in the local copy, the data from the first dataset is specified using a plurality of data objects
502

Receive, from a first application, a first request that specifies a first data object on which to perform a first data-access operation
504

Modify the first data object stored in the local cache system based on the first request
506

Send an API request to an API endpoint URL provided by the first third-party system, where the API request specifies the first data-access operation to perform using the first dataset
508

Receive, from the first application, a second request to perform a second data-access operation on the first data object
510

In response to detecting that the first third-party service has a limited level of service-availability, perform the second data-access operation using the local copy the data from the first dataset, where performing the second data-access operation includes modifying the first data object in the local cache system
512

*FIG. 5*

API SERVICE GATEWAY FOR THIRD-PARTY SERVICES

BACKGROUND

Technical Field

This disclosure relates generally to utilizing web services provided by third-party systems, and more particularly to an API service gateway between one or more applications hosted by a server system and one or more third-party services hosted by third-party systems.

Description of the Related Art

A server system may provide various web services in which the computing resources of the server system (including hardware or software elements of the server system) perform computing operations on behalf of a requesting entity. Given the ubiquity and interoperability of web services, it is a common practice for a server system to utilize the offerings of one or more third-party web services as part of its own operations. This approach may allow the server system to provide a greater range of functionality to its end users without independently developing the computing resources necessary to implement that functionality itself.

Utilizing the web services provided by a third-party also presents various technical problems, however. For example, it is common for web services to be temporarily unavailable (e.g., due to system maintenance) or for a quality-of-service to temporarily decrease (e.g., due to high traffic levels). In such instances, the decreased level of service-availability of the third-party service may negatively impact other "downstream" web service(s) that utilize functionality provided by the third-party.

BRIEF DESCRIPTION OF THE DRAWINGS

FIGS. 4-5 are flow diagrams illustrating an example methods for providing a data object interface and API service gateway, according to some embodiments.

DETAILED DESCRIPTION

Figure 1:
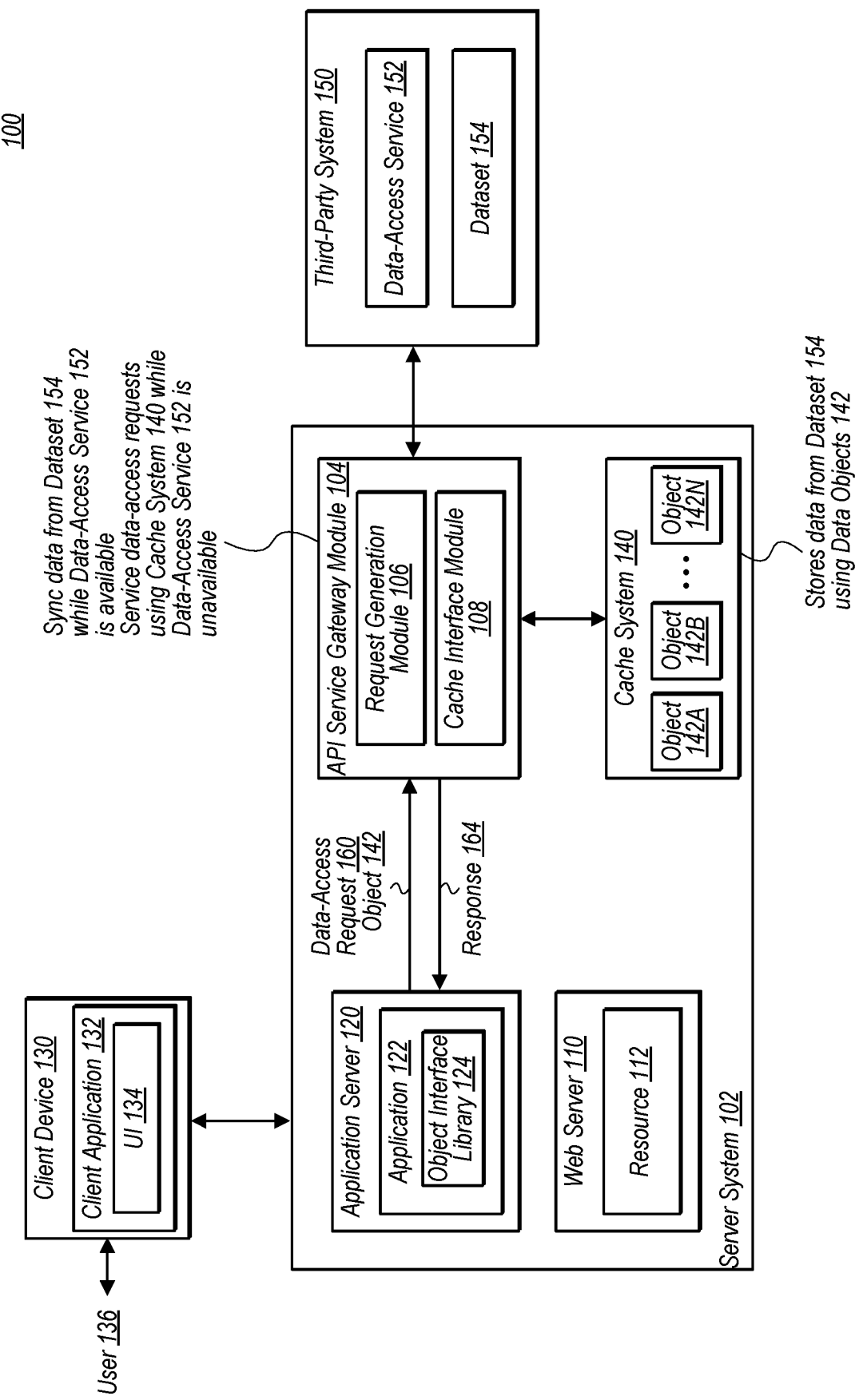
FIG. 1 is a block diagram illustrating an example server system that includes an API service gateway module that provides a service gateway between one or more applications hosted by the server system and one or more third-party services, according to some embodiments.

A server system may provide various web services in which the computing resources of the server system (including hardware or software elements of the server system) perform computing operations on behalf of a requesting entity. Non-limiting examples of web services a server system may provide include email services, streaming media services, map-based services, online payment services, retail services, etc. One common technique is for server systems to provide web services that conform to the principals of the representational state transfer ("REST") software architecture. Such REST-based (also referred to as "RESTful") services typically expose access to their services via Hypertext Transfer Protocol ("HTTP") uniform resource locator ("URL") endpoints, through which an entity may access the service. For example, a requesting entity may send an application programming interface ("API") request, specifying one or more parameters as required by the API contract, to the appropriate endpoint URL. Once it receives this API request, the server system may extract the relevant information from the request, perform the requested operation, and provide an appropriate response to the requesting entity.

Given the ubiquity and interoperability of RESTful web services, it is now common practice for a web service to utilize the offerings of one or more third-party web services as part of its own operations. Such a web service (sometimes referred to as a "mashup") may enable a web service to provide a greater range of functionality to the end user by incorporating functionality provided by a third-party service. For example, some third-party web services may provide specific "business" functionality through a RESTful API, such as a map-based service that provides navigation or traffic information. Additionally, some web services may perform (either alone or in addition to business logic functionality) data-access operations, which may include creating, reading, updating, or deleting ("CRUD") data for a requesting user. As used herein, the term "data-access service" is used to refer to a web service that performs such data-access operations on behalf of requesting entities. Applicant notes that, in some instances, a particular web service may provide data-access services in addition to other "business" services. Consider, as one non-limiting example, an instance in which a third-party service is an information technology service management ("ITSM") provider that may perform various business operations (e.g., managing hostnames for servers in a production environment) and various data-access operations (e.g., storing and maintaining data associated with the production system).

Utilizing the web services provided by a third-party also presents various technical problems, however. For example, consider an instance in which Server System A provides Web Service A and, in doing so, utilizes a Web Service B provided by a third-party Server System B to perform various data-access operations (e.g., ITSM services). In many instances, there may be times during which a third-party data-access service (e.g., Web Service B) provided by a third-party system (e.g., Server System B) has a "limited level of service-availability," which, as used herein, refers to time periods during which the third-party data-access service fails to respond to requests (e.g., RESTful API requests) within a particular time period (e.g., 200 ms, 500 ms, 1 second, 3 seconds, etc.). Note that, in this disclosure, a third-party data-access service may be said to have a "limited level of service availability" both in instances in which the third-party data-access service is completely unresponsive to API requests such that the third-party data-access service is "down" (e.g., during periodic maintenance on the third-party system) and in instances in which, while responsive to API requests, the performance of the third-party data-access service is "degraded" because the speed with which it provides responses is reduced (e.g., during periods in which the data-access service is experiencing heavy traffic). Returning to the current example, if Web Service B experiences a limited level of service-availability, this may interfere with (or prevent) Sever System A providing Web Service A. Because Server System B is under the control of a third-party, Server System A is unable to directly influence or affect the performance of Web Service B. For example, while Server System B may utilize various techniques, such as Active-Active fail-over solutions, to minimize its downtime, such measures are out of the control of Server System A, leaving it susceptible to unannounced (and potentially extended) periods during which it is unable to rely on Web Service B.

Prior attempts to address this problem suffer from various technical shortcomings. For example, one prior technique is to use an API results cache to minimize the impact of losing access to a third-party service. Using this technique, Server System A may monitor the API requests sent, by the applications it hosts, to the third-party Web Service B and, when Web Service B responds, Server System A may cache the result (e.g., using the RESTful API request URL as a cache key for that result). In this way, if Web Service B experiences a limited level of service-availability, Server System A would still have access to the previously cached API responses such that, if an application on Server System A repeats a previous API call while Service B has a limited level of service-availability, Server System A could still service that request from the cache (e.g., by using the API request URL as a key to retrieve the appropriate response from the cache).

This technique suffers from various technical problems, however. For example, if, while Web Service B is experiencing a limited level of service-availability, the application at Server System A makes a call that has not previously been serviced by Web Service B, Server System A will be unable to service this request with data from the cache. Further, even if the particular API request has been serviced by Web Service B in the past, if that request was made outside of the cache's retention window, the corresponding response may no longer be stored in the cache and, as such, Server System A would still be unable to service this request. Accordingly, prior attempts to address the above technical problems present various shortcomings.

In various embodiments, however, the disclosed systems and methods may solve these technical problems by providing a data object interface and gateway for third-party services. For example, in various embodiments, the disclosed system may include an API service gateway module that manages, and operates as a gateway for, API traffic to third-party web services. In various embodiments, the API service gateway module may receive a request, from an application hosted by the server system, for a data-access operation from a third-party service. Rather than providing that request as an API call in the format specified by the third-party service, however, the API service gateway module may operate as a data object interface, allowing the application to request the data-access operation, e.g., a request to access or modify a particular data object maintained by the third-party service, using a method call (e.g., a "getter" or "setter") of the requested data object, which is sent to the API service gateway module. Based on that method call, the API service gateway module may then generate an API request for the third-party service using the required API format and send that request to the third-party web service. When the API service gateway module then receives the response from the third-party service, the API service gateway module may return the result to the requesting application, which may then use the data from the third-party service as needed, for example as part of a web service it provides to end users.

In various embodiments, the disclosed data object interface and service gateway may provide various technical benefits. For example, it is not uncommon for third-party services to evolve over time, changing their API specification or the schema used to store user data. Using prior techniques, if a third-party service made such changes, it would be necessary to make appropriate modifications to each of the applications in the system that relied on that third-party service, wasting time and resources. In various embodiments, however, if a third-party service makes such a change, the disclosed techniques may simply modify the manner in which the API service gateway module formats the requests that it sends to that service. This, in turn, may prevent the need to modify the applications that rely on the third-party service, instead allowing these applications to continue to making data-access requests, associated with the third-party service, to the API service gateway module using method calls associated with the requested object.

Additionally, in various embodiments, the disclosed techniques further include using a local cache system to store a local copy of data from a dataset that is maintained by the third-party system to provide its data-access service(s). As described in more detail below, the disclosed techniques may include storing data from the third-party data-access service(s) using a set of data objects, which may simplify the manner in which the applications hosted by the server system request data-access operations provided via the third-party services. In various embodiments, when a third-party service experiences a limited level of service-availability, the disclosed API service gateway module may still service data-access requests from applications in the disclosed server system. For example, during periods in which the third-party service is operational and available, the disclosed systems and methods are operable to sync the data stored at the third-party service to a local cache system such that the server system has an up-to-date copy of data from the dataset utilized by the third-party service. In such embodiments, if there are any changes to the data stored at the third-party service, those changes are synced to the local cache and, similarly, if there are any changes made to the data stored in the local cache, those changes are synced to the third-party service.

In various embodiments, when the third-party service then has a limited level of service-availability (e.g., to perform maintenance, due to a system failure, etc.), the disclosed API service gateway module may then switch to reading data from, and writing data to, the local cache system. In various embodiments, this may ensure that the data that would otherwise be provided by the third-party service is still available to the applications in the system during periods in which the third-party service has a limited level of service-availability. Once the third-party service is back, the disclosed techniques may synchronize the changes made in the local cache system to the third-party service, providing data integrity between the two systems. Accordingly, in various embodiments, the disclosed API service gateway converts a potentially unstable RESTful API service provided by the third-party system into highly available data object service facilitated using the API service gateway, improving the operation of the applications and the server system as a whole.

Referring now to FIG. 1, block diagram 100 depicts a server system 102 that includes an API service gateway module 104, which, in various embodiments, provides a service gateway between one or more applications 122 hosted by application servers 120 in the server system 102 and one or more third-party web services hosted by third-party systems 150 that are external to the server system 102. (Note that, although a single third-party system 150 hosting a single data-access service 152 is shown in FIG. 1 for clarity, this non-limiting example is not intended to limit the scope of the present disclosure. As discussed below with reference to FIG. 3, the disclosed techniques may be used to provide an API service gateway to any number of third-party systems 150A-150N, each of which may provide any number of data-access services 152A-152N utilizing one or more datasets 154A-154N.) Stated differently, in various embodiments, the API service gateway module 104 replaces the RESTful API interface of one or more third-party data-access services 152 with a data object interface, which the applications 122 within the server system 102 may use to request various data-access operations from the third-party services 152. For example, as explained in more detail below with reference to FIG. 3, API service gateway module 104 may regularly sync data from one or more (and possibly many) third-party services to a local cache system 140 while those third-party services are operating normally. If and when those third-party services experience a limited level of service-availability, the API service gateway module 104 may then switch to performing the requested data-access operations using the local cache system 140, syncing those changes back to the third-party system 150 when it is again operational. Additionally, as described below, the API service gateway module 104 may store the data, from the third-party services, in the local cache using a set of data objects 142, allowing the applications 122 to interact with the third-party services by making method calls to the API service gateway module 104, rather than as API requests to the third-party services directly.

In various embodiments, server system 102 is operable to provide one or more computing resources to various end users over one or more networks (not shown, for clarity). For example, in the depicted embodiment, server system 102 includes web server 110 hosting resource 112 and application server 120 hosting application 122. In various embodiments, web server 110 hosts one or more resources 112 (e.g., web pages) used to provide a web service, which may be accessed by user 136 over one or more networks using client device 130. In various embodiments, the resource 112 may utilize one or more applications hosted by application servers in the server system 102. For example, in the depicted embodiment, resource 112 may utilize functionality provided by application 122 hosted by application server 120. As one non-limiting example, server system 102, in some embodiments, provides an online payment service that may be used by end users to perform online financial transactions (e.g., sending or receiving funds) or utilized by merchants to receive funds from users during financial transactions, as described above. Note, however, that this embodiment is described merely as one non-limiting example. In other embodiments, server system 102 may be used to provide any of various suitable web services (e.g., an email service, streaming media service, etc.) and application server 120 may be used to host any of various types of applications 122. Further, note that although only a single application server 120 is depicted in FIG. 1, this simplified embodiment is provided merely as a non-limiting example. In other embodiments, server system 102 may include any suitable number of, and potentially many, application servers 120, any of which may host one or more applications 122.

In various embodiments, one or more of the resources 112 or the applications 122 hosted within the server system 102 may utilize functionality provided by one or more third-party services. For example, in the depicted embodiment, block diagram 100 depicts a third-party system 150 that hosts a data-access service 152, which utilizes one or more datasets 154. Continuing with the non-limiting example provided above, in some embodiments the third-party system 150 may provide a data-access service 152 that performs various ITSM operations, such as storing and maintaining data associated with the production environment used by the server system 102 to provide computing resources to end users. Note, however, that this embodiment is provided merely as one non-limiting example and, in other embodiments, third-party system 150 may provide any suitable data-access services 152, optionally in addition to one or more "business logic"-type services. Further note that, although a single third-party system 150 providing a single data-access service 152 is shown in FIG. 1, this simplified embodiment is provided for clarity. In various embodiments, the disclosed API service gateway module 104 may be used as a gateway for any suitable number of third-party services.

In various embodiments, the API service gateway module 104 operates as a service gateway to various third-party web services, such as data-access service 152, providing the applications 122 within the server system 102 with access to third-party services hosted by third-party systems. For example, in performing its own functionality, application 122 may generate a request (e.g., data-access request 160) to perform a data-access operation via the data-access service 152. Rather than sending this data-access request 160 directly to the third-party system 150 (e.g., as a RESTful API request), however, the application 122 may instead send the data-access request 160 to the API service gateway module 104. Note that, in various embodiments, application 122 may send the data-access request 160 to the API service gateway module 104 as a method call, rather than as an API request that is formatted per the requirements of the data-access service 152. For example, in the depicted embodiment, application 122 includes object interface library 124, which, in various embodiments, is a software library that includes resources usable by the application 122 to format a data-access request 160 as a method call (e.g., a "getter" or "setter") associated with the relevant data object 142. Stated differently, the object interface library 124, in various embodiments, includes resources that may be used (e.g., by application 122 or other applications within the server system 102) to wrap commonly or frequently used RESTful API calls into corresponding function calls in various programming languages (e.g., Python™, Java™ Go™, or any of various other suitable programming languages). Note that, in various embodiments, the resources of object interface library 124 may include classes written in any of various suitable programming languages, such as Python™, Java™, Go™, etc.

In various embodiments, once it receives the data-access request 160, the API service gateway module 104 may then determine whether to service the data-access request 160 using the data-access service 152 or using the local copy of data, from the dataset 154, that is stored in the local cache system 140. For example, at times in which the data-access service 152 is available, the API service gateway module 104 may service the data-access request 160 by sending an appropriate request to the third-party system 150. In the depicted embodiment, for example, API service gateway module 104 includes request generation module 106, which is operable to generate an API request to the data-access service 152 to perform the operation specified in the data-access request 160. For example, based on the information specified in the data-access request 160 (such as an identifier associated with the data object 142), the request generation module 106 may identify the data-access service 152 from which the data-access operation is requested. As described with reference to FIG. 2, the request generation module 106 may then generate an API request to the appropriate data-access service 152 using a particular API request format specified by the data-access service 152.

If the third-party data-access service 152 is operational, it will receive this request, perform the requested data-access operation using the dataset 154, and (optionally) provide an API response back to the API service gateway module 104. For example, in the event that the data-access operation specified in the API request is to retrieve a record from the dataset 154, the data-access service 152 may provide an API response (e.g., as an HTTP response), to the API service gateway module 104, that specifies the data from the requested record using a suitable data interchange format (e.g., JSON, XML, etc.). The API service gateway module 104 may then provide the requested data to the application 122 as part of a response 164.

Note that, in various embodiments, API service gateway module 104 is operable to "dual write" data modifications to both the third-party data-access service 152 and to the local copy of the data stored in the local cache system 140. For example, consider an instance in which the data-access request 160 is a request to modify a data value in a field of data object 142A. In such an instance, the API service gateway module 104 may, as discussed above, generate a properly formatted API request to the data-access service 152, requesting that the appropriate modification be made to the data in dataset 154. Additionally, in some embodiments, the API service gateway module 104 may also "write" this modification to the local copy of the data object 142, updating the value for the specified data field. In doing so, the API service gateway module 104 may ensure that the version of the data stored in the cache system 140 remains consistent with the data in dataset 154 that is stored on the third-party system 150.

As noted above, there may be times during which a particular data-access service 152 has a limited level of service-availability, either because the particular data-access service 152 is entirely unresponsive (that is, the service 152 is "down") or because the performance of the particular data-access service 152 is degraded. Using prior techniques, these periods of low service-availability could interrupt, or prevent, the applications 122 in server system 102 from performing their respective functions, degrading the performance of the server system 102 as a whole. In various embodiments, however the disclosed techniques address this technical problem. For example, in response to detecting that the data-access service 152 is experiencing limited service-availability, the API service gateway module 104 is operable to service some or all of the requests for that data-access service 152 using the local cache system 140. Stated differently, in various embodiments, when the third-party data-access service 152 "goes down," the API service gateway module 104 may perform the requested data-access operations associated with that service 152 using the local cache system 140.

For example, in the depicted embodiment, API service gateway module 104 includes cache interface module 108, which is operable to perform data-access operations on the various data objects 142 stored in the local cache system 140 in response to data-access requests 160 from applications 122. The operation of cache interface module 108, according to various embodiments, is described in more detail below with reference to FIG. 2. For the purposes of the present discussion, however, consider an instance in which the data-access request 160 from application 122 is a request to modify a data value for a field of data object 142A and that, at the time of the request, the API service gateway module 104 detects that the data-access service 152 has a limited level of service-availability. In response to detecting that the data-access service 152 has a limited level of service-availability, the cache interface module 108 may perform the requested data-access operation on the data object 142A stored in the local cache system 140. In the present example, for instance, the cache interface module 108 may make the requested modification to the data object 142A in cache system 140 and provide a confirmation to the requesting application 122 in response 164.

In various embodiments, the disclosed techniques include regularly syncing the data stored in the local cache system with the datasets 154 stored by the various third-party systems 150A-150N while their respective data-access services 152 are available. For example, in some embodiments, the local cache system 140 stores local copies of data from multiple datasets 154 that are maintained by one or more (e.g., 10, 50, 100, etc.) third-party data-access services 152. In such embodiments, the API service gateway module 104 may periodically sync the local copies of the data stored in the local cache system 140 with the datasets 154 maintained by the third-party systems 150 associated with the various data-access services 152 for which the API service gateway module 104 operates as a gateway.

Additionally, note that the API service gateway module 104 may sync changes made to data stored in the cache system 140 while a given data-access service 152 was experiencing a limited level of service-availability. For example, consider an instance in which data-access service 152 has a limited level of service-availability for a period of one hour and, during that time, the API service gateway module 104 services data-access requests from the applications 122 using the local copy of data, from dataset 154, stored in cache system 140. During that time period, the API service gateway module 104 may make one or more modifications to the data objects 142 stored in cache system 140. To ensure data integrity between the server system 102 and the third-party system 150, API service gateway module 104, in various embodiments, is operable to subsequently sync these modifications to the third-party system 150 based on a determination that the data-access service 152 has become available. Non-limiting examples of the manner in which the API service gateway module 104 syncs data between the local cache system 140 and the various third-party systems is described in more detail below with reference to FIG. 3.

As noted above, the API service gateway module 104, in various embodiments, maintains data from dataset 154, utilized by data-access service 152, in the local cache system 140 using a set of data objects 142A-142N, which may provide various technical advantages. For example, dataset 154 on the third-party system 150 may be stored in various formats, such as one or more database tables. Using prior techniques, the applications 122 in server system 102 would only be able to access the data stored in the dataset 154 (e.g., to update a record or retrieve a value for a particular field) by sending an API request, formatted as required by the data-access service 152's API contract, to the appropriate API endpoint URL. In some instances, however, third-party services may change their API specification or the schema used to store user data. Using prior techniques, such a change would require appropriate modifications to each of the applications in the system that relied on that third-party service.

In various embodiments, however, the API service gateway module 104 addresses these technical problems by operating as a data object interface for the various applications 122 (or resources 112) in the server system 102, encapsulating the API interface (e.g., RESTful API interface) utilized by the data-access service 152. In the depicted embodiment, for example, the API service gateway module 104 maintains, for data-access service 152, a local copy of data, from dataset 154, in the local cache system 140. In the local copy, the data from dataset 154 is specified using a set of data objects 142A-142N. Stated differently, in various embodiments the API service gateway module 104 packages the dataset 154 (e.g., one or more database tables) into a set of one or more data objects 142, which may then be accessed, through the API service gateway module 104, by the applications 122. For example, in instances in which the dataset 154 is a database table stored at the third-party system 150, the data from the records in that database table may be specified using one or more fields in the data objects 142A-142N. In various embodiments, by encapsulating the third-party API interface and instead exposing a data object interface to the applications 122, the disclosed API service gateway module 104, in response to a change in data-access service 152's API specification, may simply modify the way it formats the requests to the data-access service 152. This, in turn, may allow the applications 122 to continue to making data-access requests for data-access service 152 to the API service gateway module 104 using method calls associated with the requested object, eliminating the time and expense that would otherwise be needed to modify these applications 122.

Note that, in some embodiments, the various elements of server system 102 may be located at the same physical location (e.g., within a single datacenter) or may be located at physical locations that are remote from one another. For example, application server 120, web server 110, cache system 140, and the host(s) of API service gateway module 104 may all be located at the same physical location, may all be located in different physical locations, or any suitable combination thereof. Further, note that, in some embodiments, one or more of application 122 and API service gateway module 104 may be implemented as microservices executed by various computer systems in the server system 102. Additionally, note that, in some embodiments, the term "server system" (such as application server 120, web server 110, or server system 102) may refer to a single machine. In other embodiments, however, the term "server system" may refer to multiple machines executing (e.g., at one or more datacenters) for the benefit of a single entity. For example, in some embodiments, one or more of web server 110, application server 120, or server system 102 may be implemented using multiple machines located at one or more datacenters.

Figure 2:
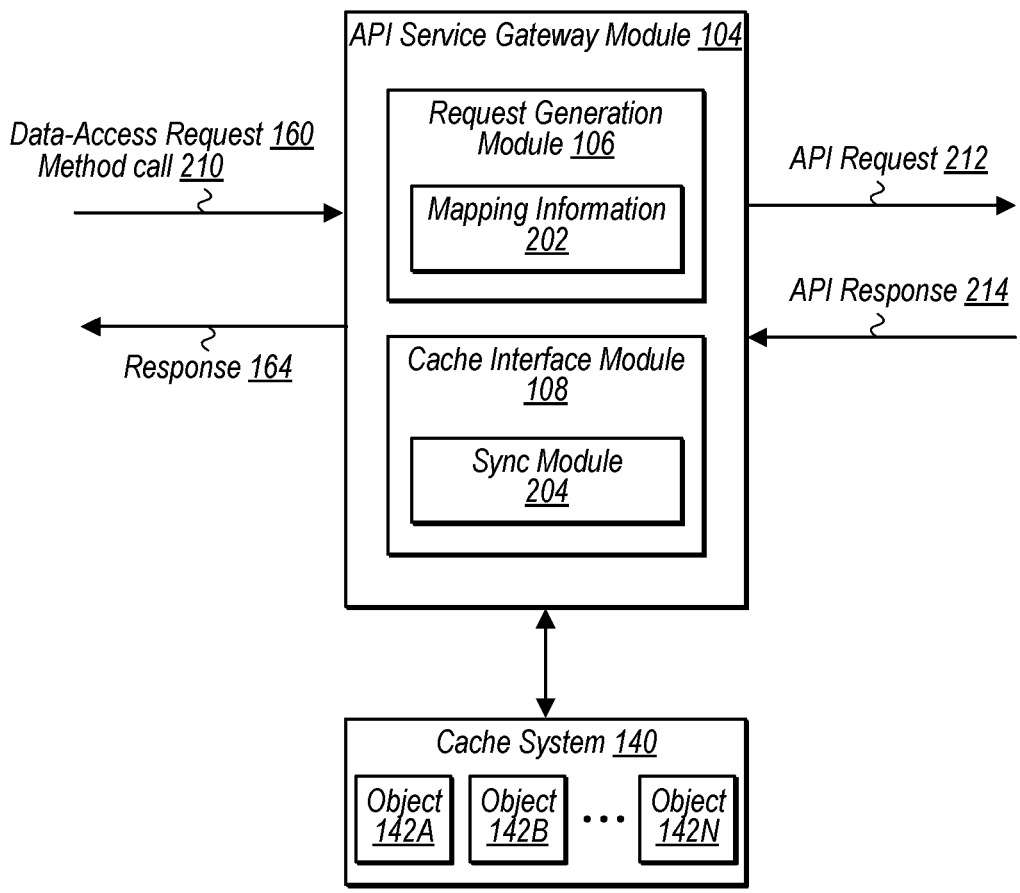
FIG. 2 is a block diagram illustrating an example API service gateway module, according to some embodiments.

Turning now to FIG. 2, block diagram 200 depicts an example API service gateway module 104, which, in the depicted embodiment, includes request generation module 106 and cache interface module 108. In various embodiments, the API service gateway module 104 is operable to provide a data object interface and act as a service gateway for one or more applications 122 hosted by server system 102.

For example, in FIG. 2, API service gateway module 104 is shown receiving a data-access request 160, from an application 122, to perform a data-access operation via a third-party data-access service 152. In the depicted embodiment, the data-access request 160 includes a method call 210 that specifies a particular data-access operation to perform on a particular data object 142. As a non-limiting example, the method call 210 may be an invocation of a "mutator" method, though this is merely one non-limiting example provided for illustration and is not intended to limit the scope of the present disclosure. In other embodiments, method call 210 may take any of various other suitable formats.

As noted above, in various embodiments the API service gateway module 104 is operable to determine whether to service the data-access request 160 using the local cache system 140 or the third-party data-access service 152 based on a level of service-availability of the service 152. In some such embodiments, the API service gateway module 104 may make this determination based on the speed with which the third-party service responds to an API request 212, if it responds at all. For example, in the depicted embodiment, API service gateway module 104 includes request generation module 106, which is operable to generate API requests 212 (e.g., RESTful API calls) to the appropriate third-party data-access service 152 based on the data-access request 160.

In FIG. 2, the request generation module 106 includes (or has access to) mapping information 202, which, in various embodiments, may be used by the request generation module 106 to generate API requests 212 to various third-party services to perform various data-access operations (or any other suitable type of operation) provided by those third-party services. Mapping information 202 may include various types of information, such as communication protocol-related information that may be used to make RESTful API calls to the various third-party data-access services 152A-N. For example, in various embodiments, the mapping information 202 may include information regarding the structure and format that the third-party services require for API requests, such as API endpoint identifiers, HTTP query parameters, token values, key values, certificate information, etc. For example, a given third-party service may provide multiple different APIs that provide various types of functionality, including data-access functionality (e.g., retrieving or updating data as part of a data-access service 152) or "business-logic" functionality. In various embodiments, each of these different APIs will have a different format (and, potentially, a different endpoint URL), specified by the third-party service, in which API requests must be formatted. In various embodiments, mapping information 202 includes various items of data usable by the request generation module 106 to generate a properly formatted API request 212 to perform the data-access operation specified in the data-access request 160. In this way, various disclosed embodiments may be said to convert the RESTful API "contracts" of the various third-party services into data object "contracts" that may be used by applications 122 in server system 102. Further note that, in various embodiments, the mapping information 202 may define the conversions to be made to a given object when generating the payload for a RESTful API request 212 based on that object. For example, in some embodiments the request generation module 106 may use this conversion information, included in the mapping information 202, to generate an API request 212 that properly converts the relevant items of data from a given data object 142 into the payload of the API request 212 sent to the third-party data-access service 152.

As a non-limiting example, for a given API provided by a given third-party service, mapping information 202 may include one or more of the following items of information: an endpoint URL, a service name/identifier, one or more parameters for which corresponding data values may be specified in the API request 212, datatypes requirements for the one or more parameters, supported request formats, supported response formats, or any of various items of information usable to format API requests 212 to the third-party service(s). Note that, in various embodiments, mapping information 202 may include information usable to format API requests 212 for multiple different third-party services and, for a given one of those third-party services, multiple different APIs. Additionally note that, in some embodiments, the mapping information 202 may include API keys associated with the different third-party services. Continuing with the non-limiting example above, for instance, in response to a data-access request 160 from application 122, the request generation module 106 may identify (e.g., based on the data object 142 specified in method call 210) the appropriate data-access service 152 (or third-party system 150) for which to generate an API request 212. In some such embodiments, the request generation module 106 may then generate an API request 212, based on the mapping information 202, to perform the requested data-access operation with the data-access service 152. For example, the request generation module 106 may optionally extract one or more items of information from the method call 210 (such as an identifier of the data object 142, the requested operation, types of changes to the data object 142 (if any), etc.) and generate an API request 212 that specifies one or more of these items of information, as specified by the mapping information 202.

As noted above, a third-party service may, over time, modify its API contract or the schema it uses to store data. Using prior techniques, such a change to a data-access service 152's API contract or to its schema/data structure for dataset 154 would necessitate corresponding changes to applications that rely on that data-access service 152. In various embodiments, however the API service gateway module 104 may simply modify the mapping information 202 to reflect the changes made by the data-access service 152, which the request generation module 106 may then use to update the format of the API requests 212 sent to that data-access service.

In various embodiments, the API service gateway module 104 may then send the API request 212 to the data-access service 152 (e.g., as an HTTP request to the appropriate endpoint URL) and wait for an API response 214 in return. In various embodiments, if the API service gateway module 104 receives the API response 214 (e.g., within 200 milliseconds), it may then provide a corresponding response 164 to the requesting application 122. Note that the content of the response 164 may vary depending on the type of data-access operation requested. For example, in the event that the data-access operation is a request to retrieve a particular data value, the API response 214 may include the requested data (e.g., from dataset 154), which the API service gateway module 104 may pass to the requesting application 122 in the response 164. If, however, the data-access operation is a request to modify or create a particular data value, the API response 214 may simply include a confirmation that the requested data-access operation was successfully performed, in which case a corresponding notification may be included in the response 164. As noted above, in various embodiments the API service gateway module 104 performs dual reads and/or dual writes to both the relevant third-party system 150 and the cache system 140. Accordingly, in some such embodiments, the API service gateway module 104 may modify the data stored in the local cache system 140 either in response to the data-access request 160 or based on the API response 214, as desired.

In various embodiments, however, if the API service gateway module 104 detects that the data-access service 152 has a low-level of service availability (e.g., is responding slowly or not at all), the API service gateway module 104 may perform the requested data-access operation using the local copy of the data from dataset 154 that is stored in the cache system 140. For example, consider an instance in which the API service gateway module 104 sends the API request 212 to the data-access service 152 but does not receive an API response 214 within a particular time period. In such a situation, the API service gateway module 104 may determine that the data-access service 152 has a limited level of service-availability and, therefore, unable to service the API request 212. In such embodiments, the API service gateway module 104 may determine that the requested data-access operation is instead to be serviced using the cache system 140. For example, in the depicted embodiment, the API service gateway module 104 includes cache interface module 108, which is capable of maintaining and accessing the data stored in local cache system 140. In response to detecting that the data-access service 152 has a limited level of service-availability, the cache interface module 108 may perform the requested data-access operation using the data objects 142 stored in cache system 140.

In various embodiments, when the particular data-access service 152 is non-responsive, the API service gateway module 104 may continue to service all data-access requests associated with the data-access service 152 using the local cache system 140 until the API service gateway module 104 detects that the data-access service 152 has an increased level of service availability. For example, for subsequent data-access requests 160 from requesting applications 122, the API service gateway module 104 may continue to generate and send API requests 212 and, if no API responses 214 are received, service the data-access requests associated with that data-access service 152 using the local cache system 140.

In some embodiments, however, a particular data-access service 152 may exhibit a decreased level of service availability while still being responsive to API requests 212. For example, during periods of heavy load, the latency of API responses 214 from a data-access service 152 may increase. In some such embodiments, the API service gateway module 104 may continue to service all data-access requests associated with that data-access service 152 using the local cache system 140 until the level of service-availability increases (e.g., the latency of the API responses 214 decreases). In other embodiments, however, when the performance of the data-access service 152 is degraded, the API service gateway module 104 may opt to service some of the data-access requests 160 using the local cache system 140 and other data-access requests 160 using the data-access service 152.

For example, in some such embodiments, the API service gateway module 104 may service a first subset of subsequent data-access requests 160 to perform data-access operations via the data-access service 152, from one or more applications 122, using the API(s) provided by the data-access service. For the remaining subsequent data-access requests 160 during this period in which the performance of the data-access service is degraded, the API service gateway module 104 may use the local copy of the data from the dataset 154 that is stored in the cache system 140. The API service gateway module 104 may determine whether to service a given data-access request 160 using the cache system 140 or the data-access service 152 based on any combination of various factors, such as a priority of the data-access request 160, a priority associated with the application, etc. In some embodiments, for example, the various services provided by the server system 102 (e.g., by the various applications 122) may be categorized (or "tagged") into tiers based, for example, on how critical they are to the operation of server system 102. In some such embodiments, when the performance of a particular data-access service 152 is degraded (e.g., data-access service 152A), data-access requests 160 from the critical (e.g., "Tier 1") services or applications 122 (within server system 102) may be serviced using the data-access service 152A by the API service gateway module 104 sending an API request 212, while data-access requests 160 from less critical (e.g., "Tier 3," "Tier 4," etc.) services or applications 122 (within server system 102) may be serviced using the local cache system 140. In this way, the disclosed techniques may reduce the load to the degraded third-party data-access service 152.

As noted above, in various embodiments, the disclosed techniques include performing regular (e.g., periodic) two-way sync operations between the datasets 154 stored at the third-party systems 150 and the copy of the data, from those datasets 154, that is stored in the local cache system 140. For example, in FIG. 2, API service gateway module 104 includes data sync module 204, which is operable to periodically sync data stored in the cache system 140 with the datasets 154 stored by one or more third-party systems. Additionally, as noted above, in various embodiments the API service gateway module 104 is operable to synchronize changes made to the data stored in the cache system 140 while a given data-access service 152 was experiencing a limited level of service-availability. For example, in instances in which the API service gateway module 104 services one or more data-access requests using the local cache system 140, it may subsequently sync those changes to the relevant third-party system 150 once the API service gateway module 104 detects that the data-access service 152 has an increased level of service availability (e.g., based on a latency associated with an API response 214 from the data-access service 152). In various embodiments, syncing data between the local cache system 140 and the various third-party systems 150 helps ensure data integrity between the different systems.

Note that, in some embodiments, the API service gateway module 104 is operable to perform various internal data-processing operations, such as data dependencies, data drift monitoring and evaluations, etc. Accordingly, in some such embodiments, mapping information 202 may be used between two or more Object classes within the internal server system 102.

Figure 3:
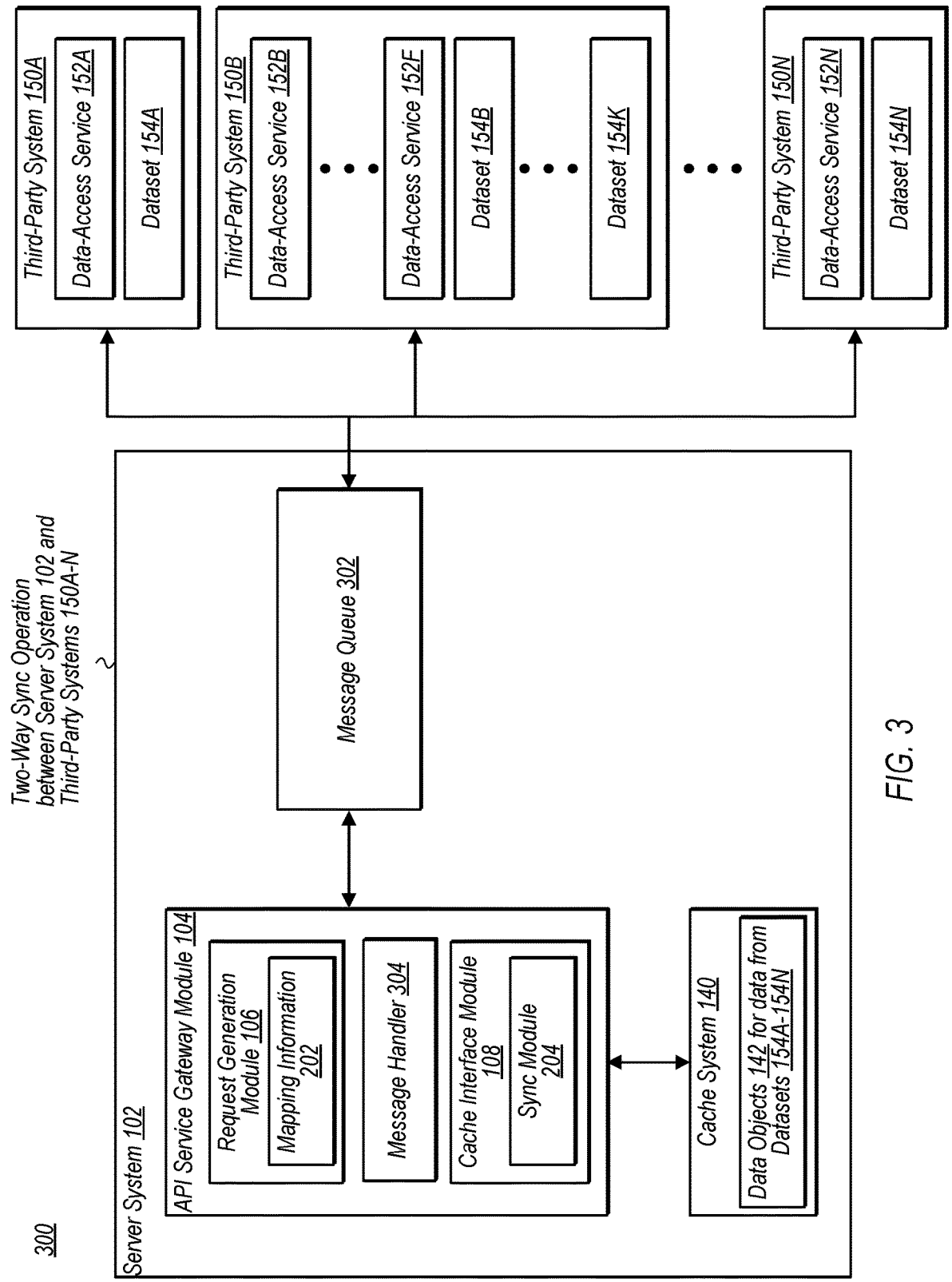
FIG. 3 is a block diagram illustrating a two-way sync operation between an API service gateway module and a plurality of third-party services provided by third-party systems, according to some embodiments.

Referring now to FIG. 3, block diagram 300 depicts API service gateway module 104, which, in various embodiments, is operable to sync data from various third-party systems 150A-150N to the local cache system 140. For example, as noted above, API service gateway module 104 may act as a service gateway and data object interface for multiple third-party services 152A-152N provided by multiple third-party systems 150A-150N. Note that, the disclosed API service gateway module 104 may be used to provide an API service gateway to any number of third-party systems 150A-150N, any of which may provide one or more data-access services 152 utilizing one or more datasets 154. For example, in the embodiment depicted in FIG. 3, third-party system 150A provides a single data-access service 152A that utilizes a single dataset 154A. Third-party system 150B, however, provides multiple (potentially independent) data-access services 152B-152F. Further, in this embodiment, any of the data-access services 152, such as data-access service 152B, may utilize multiple datasets, such as datasets 154B-154D.

In various embodiments, data may be synchronized between the server system 102 and the various third-party systems 150A-150N utilizing a publisher/subscriber model. For example, in the depicted embodiment, server system 102 includes a message queue 302, which may be implemented using the Apache™ Kafka stream-processing platform, though any of various other suitable message queue technologies may be used. In various embodiments, message queue 302 may be used to publish modifications that are made to data stored at either the local cache system 140 or the third-party systems 150A-150N so that those modifications can be synchronized between the respective systems.

For example, consider an instance in which data-access service 152A provided by third-party system 150A temporarily experiences a limited level of service-availability (e.g., due to scheduled maintenance) and, during that time period, API service gateway module 104 services data-access requests associated with the data-access service 152A, from applications 122, using a local copy of the data from dataset 154A that the API service gateway module 104 maintains in local cache system 140. In such an embodiment, once the API service gateway module 104 detects that the data-access service 152A has an increased level of service-availability, the API service gateway module 104 may sync any changes made during this time period back to the third-party system 150A to ensure data integrity between the two systems. For example, the API service gateway module 104 may send one or more messages specifying those changes (e.g., as "change events") to the message queue 302, where these message(s) may be consumed by the data-access service 152A (or another service associated with third-party system 150A). Similarly, if a modification is made to data in dataset 154B stored by third-party system 150B (e.g., by an entity other than API service gateway module 104), the data-access service 152B (or another service associated with third-party system 150B) may offer an event notification service that publishes one or more messages specifying these changes to the message queue 302, where these message(s) may be consumed by the message handler 304 and used by the data sync module 204 to update the data stored in the cache system 140 accordingly.

Note that, in various embodiments, the disclosed techniques may include performing both event-driven sync operations and periodic sync operations to synchronize the local cache system 140 and (at least a portion of) the various datasets 154A-N maintained by the third-party systems 150A-N. In some such embodiments, the event-driven sync operations may be performed such that any change to the data stored in cache system 140 or in the datasets 154A-N are captured as a change event. For example, in some embodiments, sync module 204 is operable to detect when a change is made to the data stored in cache system 140 and generate a change event indicative of that change. In some embodiments, the API service gateway module 104 may then send an API request 212, to the relevant third-party data-access service 152, to make a corresponding change to the appropriate dataset 154 to ensure consistency between the cache system 140 and the dataset 154 maintained by the third-party system 150. Note that, in some embodiments, if the third-party data-access service 152 is experiencing limited service availability at the time the API request 212 is sent, that API request 212 will fail. In some such embodiments, a call event message (corresponding to the modification to data in cache system 140) may be published to the message queue 302 such that, when the third-party data-access service 152 is available again, the event message may be processed by the message handler 304 and provided to the appropriate third-party system 150 through a RESTful API call.

Similarly, as noted above, the various data-access services 152 may include or utilize event notification services that publish event messages, to message queue 302, that are indicative of changes in their respective dataset(s) 154. A change event message may include any of various items of information. As a non-limiting example, in some embodiments a change event may specify the type of change made (e.g., record creation, deletion, modification, etc.). In some such embodiments, these change events may be received at the message queue 302 and processed by the message handler 304 in the API service gateway module 104. For example, in some embodiments, the message handler 304 (optionally in conjunction with the sync module 204) may use the information included in a change event message to modify the data objects 142 stored in the local cache system 140.

Note that, in various embodiments, the event-driven sync operations may be performed in real-time or near real-time (e.g., within milliseconds, seconds, minutes of the change event). In some embodiments, however, it may also be advantageous to perform periodic (e.g., daily, weekly, etc.) full sync operations to help ensure data integrity between the cache system 140 and the various third-party systems 150. In some embodiments, the periodic sync operation may include retrieving each mapped dataset 154 (e.g., in the form of tables) from the third-party data-access service 152 and comparing the data from the dataset 154 to the corresponding data objects 142 stored in the cache system 140. If there are any differences between the data stored in cache system 140 and the dataset 154, appropriate modifications may then be made (e.g., by publishing change event messages to message queue 302 or sending API requests 212 to the data-access service 152) to ensure data integrity between the two systems. Note that, in some embodiments, during the periodic sync operations, the sync module 204 may monitor the version of the data (e.g., the version of the data objects 142 in local cache system 140, the version of dataset(s) 154 (or the data stored therein)) during the sync such that the latest version of the data is not overwritten while the sync is performed (e.g., in a distributed manner).

Additionally note that, in various embodiments, the API service gateway module 104 may operate as a central data-conversion and cache solution for any RESTful data-access service 152 that is capable of sending data-change event messages to the message queue 302. In such embodiments, the API service gateway module 104 may convert the RESTful call into a data object API interface and handle mapping from the third-party data format to the local cache system 140 format. Further, note that, in some embodiments, the various services performed by server system 102 (e.g., by one or more of the applications 122) may use the data object interface, provided by the API service gateway module 104, that won't rely on the RESTful interface provided by a given third-party data-access service 152 anymore.

Example Methods

Referring now to FIG. 4, a flow diagram illustrating an example method 400 for providing a data object interface and API service gateway is depicted, according to some embodiments. In various embodiments, method 400 may be performed by API service gateway module 104 of FIG. 1 to provide one or more applications 122 in the server system 102 with access to various third-party services (such as data-access service 152). For example, server system 102 may include (or have access to) a non-transitory, computer-readable medium having program instructions stored thereon that are executable by the server system 102 to cause the operations described with reference to FIG. 4. In FIG. 4, method 400 includes elements 402-410. While these elements are shown in a particular order for ease of understanding, other orders may be used. In various embodiments, some of the method elements may be performed concurrently, in a different order than shown, or may be omitted. Additional method elements may also be performed as desired.

At 402, in the illustrated embodiment, the server system provides a service gateway for a plurality of applications hosted by one or more application servers in the server system. In the depicted embodiment, the service gateway is operable to provide the plurality of applications with access to a plurality of third-party services hosted by third-party systems. For example, with reference to block diagram 100 of FIG. 1, server system 102 may provide an API service gateway module 104 that operates as a gateway between one or more (e.g., 10, 100, 1000, etc.) applications 122 in the server system 102 and multiple third-party services, such as data-access service 152, hosted by one or more third-party systems 150.

At 404, in the illustrated embodiment, the service gateway maintains, for a first one of the plurality of applications, a local copy of data, from a first dataset, in a local cache system. As noted above, in some such embodiments, the first dataset may be stored by a first third-party system that provides the first third-party service using the first dataset. Further, in the local copy, the data from the first dataset may be specified using a plurality of data objects. For example, API service gateway module 104 may maintain local cache system 140 that stores data from dataset 154, which is stored at third-party system 150 and used by third-party data-access service 152 to perform various operations on behalf of its clients (e.g., the applications 122 of server system 102, in the instant example). Further, as described herein, the API service gateway module 104 may operate as a data object interface for the applications 122 to access the data hosted by the data-access service 152. Accordingly, in various embodiments, the API service gateway module 104 maintains the data from the dataset 154 using one or more data objects 142. This, in turn, may allow the applications 122 to request data-access operations for the data stored using these data objects 142 using method calls (e.g., "get" and "set" methods), encapsulating the data from the dataset 154 and providing the applications with an interface that is independent of the particular API request requirements of the third-party services.

Although a single third-party system 150 and data-access service 152 are shown in FIG. 1 for clarity, this simplified example is not intended to limit the scope of the present disclosure. Instead, in various embodiments, the API service gateway module 104 may be used to provide the applications 122 with access to any suitable number of, and potentially many (e.g., hundreds, thousands, etc.) of third-party services and systems. Accordingly, in some embodiments, the API service gateway module 104 may store in the cache system 140 local copies of data from a plurality of datasets that are maintained by multiple third-party services and, in some such embodiments, the API service gateway module 104 may periodically sync these local copies of the data from the plurality of datasets, stored in the cache system 140, with the datasets 154 maintained at the third-party systems 150 associated with the third-party services.

At 406, in the illustrated embodiment, the service gateway receives, from a first application, a request to perform a data-access operation via a first third-party service. For example, as shown in FIG. 1, API service gateway module 104 may receive a data-access request 160 from application 122, hosted by application server 120, to perform a data-access operation via data-access service 152. In some such embodiments, this data-access request 160 may be provided as a method call (e.g., a "setter") that identifies the data object 162 on which to perform the data-access operation.

At 408, in the illustrated embodiment, the service gateway detects that the first third-party service has a limited level of service-availability. For example, the API service gateway module 104 may generate an API request 212 for the first third-party service (e.g., data-access service 152) to perform the requested data-access operation, where the API request 212 is formatted using a particular format specified by the first third-party service (e.g., as provided by the mapping information 202). The API service gateway module 104 may then determine whether the third-party service has a limited level of service-availability based on the speed with which the third-party service responds, if it responds at all. For example, API service gateway module 104 may detect that the data-access service 152 has a limited level of service-availability, which, as noted above, may include determining that the data-access service 152 is "down" (e.g., not responding to requests to perform data-access operations) by sending the API request 212 to the first third-party service and determining that an API response 214 from the first third-party service has not been received within a particular time period. Additionally, in some embodiments, the API service gateway module 104 may detect that the first third-party service has a limited level of service availability by sending the API request 212 to the first third-party service and determining that, while still operational, the performance quality of the data-access service 152 is degraded based on a latency associated with the API response 214 from the first third-party service. Note that, in some embodiments, the "latency threshold" utilized by the API service gateway module 104 (that is, the amount of latency associated with an API response 214 from a third-party service required before the third-party service is deemed to have a "limited level of service availability") may vary, for example based on the third-party system 150, the third-party service 152, the time of day, etc. Referring again to block diagram 300 of FIG. 3, in one non-limiting example the latency threshold associated with data-access service 152A may be 500 ms while the latency threshold associated with data-access service 152B may be 1 second. Thus, in various embodiments, the API service gateway module 104 may use different latency threshold values (or ranges of threshold values) to determine whether the various data-access services 152 are experiencing a limited level of service availability. In some embodiments, these threshold values may be determined based on service-level agreements ("SLAs") associated with the various data-access services 152.

In the depicted embodiment, in response to detecting that the first third-party service has a limited level of service-availability, the service gateway performs the data-access operation using the local copy of the data from the first dataset. In some embodiments, performing the data-access operation includes modifying the first data object stored in the local cache system. For example, in various embodiments, element 408 may include modifying a value for one or more fields of a data object 142 based on the data-access request 160. Note that, in some embodiments, in response to detecting that the third-party data-access service has a limited level of service-availability, the service gateway may perform all requested data-access operations for that third-party service until the service gateway detects that the third-party service is available. In other embodiments, such as embodiments in which the service gateway detects that the performance of the third-party service is degraded, the API service gateway module 104 may service a portion of the requests (e.g., from applications 122) to perform data-access operations via that third-party data-access service 152 using the service 152 (e.g., by generating and sending API requests 212 to the data-access service 152) and may service a portion of the requests itself (that is, using the local cache system 140). For example, in such embodiments, the service gateway may service a first subset of subsequent requests to perform data-access operations via the first third-party service, from one or more of the plurality of applications, using an API provided by the first third-party service, and may service a second subset of the subsequent requests to perform data-access operations via the first third-party service using the local copy of the data from the first dataset. In some such embodiments, the service gateway may determine whether to service a given request using the local cache or the third-party service based on any of various suitable factors, such as the priority of the request (e.g., as indicated as part of the data-access request 160), the requesting application 122, the priority of the requesting application 122, time of day at which the data-access request 160 was received, number of requests sent by the requesting application 122 over a particular time period, etc. Further note that, in some embodiments, data-access requests 160 from a single application 122 may be included in both the first and second subsets such that one request is serviced using the local cache system and one request is serviced using the first third-party service.

At 410, in the illustrated embodiment, the service gateway syncs the modification to the first data object (stored in the local cache system) to the first third-party service based on a determination that the first third-party service has an increased level of service-availability. As described above with reference to FIG. 3, in various embodiments, the API service gateway module 104 is operable to periodically sync the data stored in cache system 140 with the data from the various datasets 154 of the third-party data-access services 152 for which the API service gateway module 104 operates as a gateway. In some embodiments, method 400 may further include, prior to receiving the request to perform the data-access operation via the first third-party service, the API service gateway module 104 syncing the local copy of the data from the first dataset 154 stored in the local cache system 140 with the first dataset 154 that is maintained by the first third-party system 150.

Referring now to FIG. 5, a flow diagram illustrating an additional example method 500 for providing a data object interface and API service gateway is depicted, according to some embodiments. In various embodiments, method 500 may be performed by API service gateway module 104 of FIG. 1 to provide one or more applications 122 in the server system 102 with access to various third-party services (such as data-access service 152). For example, server system 102 may include (or have access to) a non-transitory, computer-readable medium having program instructions stored thereon that are executable by the server system 102 to cause the operations described with reference to FIG. 5. In FIG. 5, method 500 includes elements 502-512. While these elements are shown in a particular order for ease of understanding, other orders may be used. In various embodiments, some of the method elements may be performed concurrently, in a different order than shown, or may be omitted. Additional method elements may also be performed as desired.

At 502, in the illustrated embodiment, the service gateway maintains, for a first one of a plurality of third-party services hosted by third-party systems, a local copy of data, from a first dataset, in a local cache system. For example, with reference to block diagram 100 of FIG. 1, API service gateway module 104 maintains, for data-access service 152, a local copy of data, in local cache system 140, from dataset 154. In the embodiment of FIG. 1, the first dataset 154 is stored by a first third-party system 150 that provides the first third-party service (e.g., data-access service 152) using the first dataset 154. Further note that, in some embodiments, the local copy of the data from the first dataset 154 is specified, in the local cache system 140, using a plurality of data objects 142A-142N.

At 504, in the illustrated embodiment, the service gateway receives, from one of a plurality of applications hosted by the server system, a first request that specifies a first data object on which to perform a first data-access operation. For example, API service gateway module 104 may receive a first data-access request 160 from an application 122, where the data-access request 160 specifies a particular data object 142 on which to perform the requested data-access operation. At 506, in the illustrated embodiment, the service gateway modifies the first data object stored in the local cache system based on the first request. For example, the API service gateway module 104 may modify one or more data fields of a data object 142 stored in the cache system 140 based on the data-access request 160.

At 508, in the illustrated embodiment, the service gateway sends an API request to an API endpoint URL provided by the first third-party system, where the API request specifies the first data-access operation to perform using the first dataset. For example, request generation module 106 may generate an API request 212 to the data-access service 152 based on mapping information 202, and the API service gateway module 104 may send the API request 212 to the data-access service 152. Note that, although shown before element 508 in the depicted embodiment, in some embodiments, element 506 may be performed after the API request 212 has been sent to the data-access service 152 (e.g., after the API service gateway module 104 receives the API response 214 from the data-access service 152).

At 510, in the illustrated embodiment, the service gateway receives, from the first application, a second request to perform a second data-access operation on the first data object. For example, the application 122 may send an additional data-access request 160 to perform a second (potentially different) data-access operation on a particular data object 142. At 512, in the illustrated embodiment, in response to detecting that the first third-party service has a limited level of service-availability, the service gateway performs the second data-access operation using the local copy the data from the first dataset, including by modifying the first data object in the local cache system. For example, the API service gateway module 104 may send an API request 212 to the data-access service 152 and, if an API response 214 is not received within a particular amount of time, the API service gateway module 104 may instead service that data-access request 160 using the local cache system 140, as discussed above.

In some embodiments, method 500 further includes the service gateway subsequently syncing the modification to the first data object to the first third-party system based on a determination that the first third-party service has an increased level of service-availability, for example as described above with reference to FIGS. 1-3. Further, in some embodiments, method 500 may include the service gateway modifying the manner in which it generates API requests to a particular third-party service based on an update to that service's API contract or data storage schema. For example, in some such embodiments, method 500 may include receiving, from the first third-party service, information specifying a new version of the second format for API requests associated with the second data-access operation. Based on that information, the service gateway may update mapping information used (e.g., by request generation module 106) to generate the API requests, for the first third-party service, associated with the second data-access operation.

Example Computer System

Figure 6:
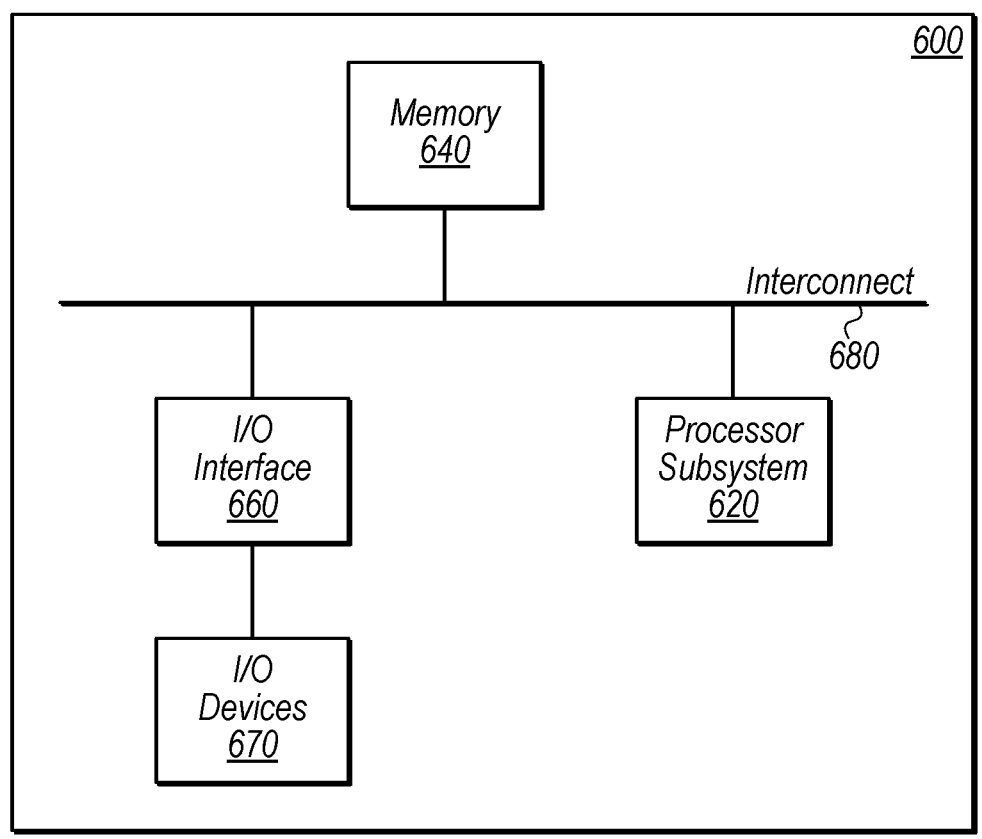
FIG. 6 is a block diagram illustrating an example computer system, according to some embodiments.

Referring now to FIG. 6, a block diagram of an example computer system 600 is depicted, which may implement one or more computer systems, such as application server 120 or server system 102 of FIG. 1, according to various embodiments. Computer system 600 includes a processor subsystem 620 that is coupled to a system memory 640 and I/O interfaces(s) 660 via an interconnect 680 (e.g., a system bus). I/O interface(s) 660 is coupled to one or more I/O devices 670. Computer system 600 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 600 is shown in FIG. 6 for convenience, computer system 600 may also be implemented as two or more computer systems operating together.

Processor subsystem 620 may include one or more processors or processing units. In various embodiments of computer system 600, multiple instances of processor subsystem 620 may be coupled to interconnect 680. In various embodiments, processor subsystem 620 (or each processor unit within 620) may contain a cache or other form of on-board memory.

System memory 640 is usable to store program instructions executable by processor subsystem 620 to cause system 600 perform various operations described herein. System memory 640 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as system memory 640. Rather, computer system 600 may also include other forms of storage such as cache memory in processor subsystem 620 and secondary storage on I/O devices 670 (e.g., a hard drive, storage array, etc.). In some embodiments, these other forms of storage may also store program instructions executable by processor subsystem 620.

I/O interfaces 660 may be any of various types of interfaces configured to couple to and communicate with other devices, according to various embodiments. In one embodiment, I/O interface 660 is a bridge chip (e.g., Southbridge) from a front-side to one or more back-side buses. I/O interfaces 660 may be coupled to one or more I/O devices 670 via one or more corresponding buses or other interfaces. Examples of I/O devices 670 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 670 includes a network interface device (e.g., configured to communicate over WiFi, Bluetooth, Ethernet, etc.), and computer system 600 is coupled to a network via the network interface device.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments described herein are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated, including the following: Claim 3 (could depend from any of claims 1-2); claim 4 (any preceding claim); claim 5 (claim 4), etc. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—"[entity] configured to [perform one or more tasks]"—is used herein to refer to structure (i.e., something physical). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for [performing a function]" construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

In this disclosure, various "modules" operable to perform designated functions are shown in the figures and described in detail (e.g., API service gateway module 104, request generation module 106, cache interface module 108, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

What is claimed is:

1. A method, comprising:
    providing, by a server system, a service gateway for a plurality of applications hosted by one or more application servers in the server system, wherein the service gateway is operable to provide the plurality of applications with access to a plurality of third-party services hosted by third-party systems;
    maintaining, by the service gateway for a first one of the plurality of third-party services, a local copy of data, from a first dataset, in a local cache system, wherein the first dataset is stored by a first third-party system that provides the first third-party service using the first dataset, and wherein, in the local copy, the data from the first dataset is specified using a plurality of data objects;
    receiving, by the service gateway from a first one of the plurality of applications, a request to perform a data-access operation via the first third-party service, wherein the request specifies a first data object of the plurality of data objects;
    in response to detecting that the first third-party service has a limited level of service-availability, performing, by the service gateway, the data-access operation using the local copy the data from the first dataset, wherein the performing the data-access operation includes modifying the first data object in the local cache system; and
    subsequently syncing, by the service gateway, the modification to the first data object to the first third-party system based on a determination that the first third-party service has an increased level of service-availability.

2. The method of claim 1, further comprising:
    prior to receiving the request to perform the data-access operation via the first third-party service, syncing, by the service gateway, the local copy of the data from the first dataset stored in the local cache system with the first dataset maintained at the first third-party system.

3. The method of claim 1, wherein the request to perform the data-access operation is provided as a method call from the first application; and
    wherein the detecting that the first third-party service has a limited level of service-availability includes generating, by the service gateway, an API request for the first third-party service to perform the data-access operation, wherein the API request is formatted using a second format specified by the first third-party service.

4. The method of claim 3, wherein the detecting that the first third-party service has a limited level of service-availability further includes:
    sending, by the service gateway, the API request to the first third-party service; and
    determining, by the service gateway, that an API response from the first third-party service has not been received within a particular time period.

5. The method of claim 3, wherein the detecting that the first third-party service has a limited level of service-availability further includes:
    sending, by the service gateway, the API request to the first third-party service; and
    determining, by the service gateway, that a performance of the first third-party service is degraded based on a latency associated with an API response from the first third-party service.

6. The method of claim 1, further comprising:
    in response to detecting that the first third-party service has a limited level of service-availability, the service gateway:
        servicing a first subset of subsequent requests to perform data-access operations via the first third-party service, from one or more of the plurality of applications, using an API provided by the first third-party service; and
        servicing a second subset of the subsequent requests to perform data-access operations via the first third-party service using the local copy of the data from the first dataset.

7. The method of claim 6, further comprising:
    determining whether to service a given one of the subsequent requests using the local cache system based on a priority associated with the given request.

8. The method of claim 1, wherein the local cache system stores local copies of data from a plurality of datasets that are maintained by a subset of the plurality of third-party services, wherein the method further comprises:
periodically syncing, by the service gateway, the local copies of the data from the plurality of datasets, stored in the local cache system, with the plurality of datasets maintained by a subset of the third-party systems associated with the subset of the plurality of third-party services.

9. A non-transitory, computer-readable medium having instructions stored thereon that are executable by a server system to perform operations comprising:
maintaining, by a service gateway for a first one of a plurality of third-party services hosted by third-party systems, a local copy of data, from a first dataset, in a local cache system, wherein the first dataset is stored by a first third-party system that provides the first third-party service using the first dataset, and wherein, in the local copy, the data from the first dataset is specified using a plurality of data objects;
receiving, by the service gateway from a first one of a plurality of applications hosted by the server system, a first request that specifies a first data object on which to perform a first data-access operation;
modifying, by the service gateway, the first data object stored in the local cache system based on the first request;
sending, by the service gateway, an API request to an API endpoint URL provided by the first third-party system, wherein the API request specifies the first data-access operation to perform using the first dataset;
receiving, by the service gateway from the first application, a second request to perform a second data-access operation on the first data object; and
in response to detecting that the first third-party service has a limited level of service-availability, performing, by the service gateway, the second data-access operation using the local copy the data from the first dataset, wherein the performing the second data-access operation includes modifying the first data object in the local cache system.

10. The non-transitory, computer-readable medium of claim 9, wherein the operations further comprise:
subsequently syncing, by the service gateway, the modification to the first data object to the first third-party system based on a determination that the first third-party service has an increased level of service-availability.

11. The non-transitory, computer-readable medium of claim 9, wherein the operations further comprise:
prior to receiving the first request to perform the first data-access operation, syncing, by the service gateway, the local copy of the data from the first dataset stored in the local cache system with the first dataset maintained at the first third-party system.

12. The non-transitory, computer-readable medium of claim 9, wherein the second request to perform the second data-access operation is provided as a method call from the first application, and
wherein the detecting that the first third-party service has a limited level of service-availability includes generating, by the service gateway, a second API request for the first third-party service to perform the second data-access operation, wherein the second API request is formatted using a second format specified by the first third-party service.

13. The non-transitory, computer-readable medium of claim 12, wherein the operations further comprise:
receiving, from the first third-party service, information specifying a new version of the second format for API requests associated with the second data-access operation; and
updating, by the service gateway, mapping information used by the service gateway to generate the API requests, for the first third-party service, associated with the second data-access operation.

14. The non-transitory, computer-readable medium of claim 9, wherein the detecting that the first third-party service has a limited level of service-availability includes:
sending, by the service gateway, a second API request to the first third-party service; and
determining, by the service gateway, that an API response from the first third-party service has not been received within a particular time period.

15. The non-transitory, computer-readable medium of claim 9, wherein the detecting that the first third-party service has a limited level of service-availability further includes:
sending, by the service gateway, a second API request to the first third-party service; and
determining, by the service gateway, that a performance of the first third-party service is degraded based on a latency associated with an API response from the first third-party service.

16. A system, comprising:
at least one processor;
a non-transitory, computer-readable medium having instructions stored thereon that are executable by the at least one processor to cause the system to:
provide a service gateway for a plurality of applications hosted by one or more application servers in the system, wherein the service gateway is operable to provide the plurality of applications with access to a plurality of third-party services hosted by third-party systems;
maintain, by the service gateway for a first one of the plurality of third-party services, a local copy of data, from a first dataset, in a local cache system, wherein the first dataset is stored by a first third-party system that provides the first third-party service using the first dataset, and wherein, in the local copy, the data from the first dataset is specified using a plurality of data objects; and
in response to detecting that the first third-party service has a limited level of service-availability, the service gateway:
servicing a first subset of subsequent requests to perform data-access operations via the first third-party service, from one or more of the plurality of applications, using an API provided by the first third-party service; and
servicing a second subset of the subsequent requests to perform data-access operations via the first third-party service using the local copy of the data from the first dataset.

17. The system of claim 16, wherein the instructions are further executable to cause the system to:
determine whether to service a given one of the subsequent requests using the local cache system based on a priority associated with an application that sent the given request.

18. The system of claim 16, wherein both the first and second subsets of subsequent requests include requests sent by a first one of the plurality of applications.

19. The system of claim 16, wherein the instructions are further executable to cause the system to:
- determine, by the service gateway, that a performance of the first third-party service is degraded based on a latency associated with an API response from the first third-party service.

20. The system of claim 16, wherein the local cache system stores local copies of data from a plurality of datasets that are maintained by a subset of the plurality of third-party services, wherein the instructions are further executable to cause the system to:
- periodically sync, by the service gateway, the local copies of the data from the plurality of datasets, stored in the local cache system, with the plurality of datasets maintained by a subset of the third-party systems associated with the subset of the plurality of third-party services.

* * * * *